(12) United States Patent
Saeki

(10) Patent No.: US 10,486,515 B2
(45) Date of Patent: Nov. 26, 2019

(54) VEHICLE LOWER SECTION STRUCTURE

(71) Applicant: TOYOTA JIDOSHA KABUSHIKI KAISHA, Toyota-shi (JP)

(72) Inventor: Koji Saeki, Okazaki (JP)

(73) Assignee: TOYOTA JIDOSHA KABUSHIKI KAISHA, Toyota-shi (JP)

(\*) Notice: Subject to any disclaimer, the term of this patent is extended or adjusted under 35 U.S.C. 154(b) by 0 days.

(21) Appl. No.: 15/804,218

(22) Filed: Nov. 6, 2017

(65) Prior Publication Data

US 2018/0126835 A1  May 10, 2018

(30) Foreign Application Priority Data

Nov. 7, 2016  (JP) ................... 2016-217458

(51) Int. Cl.
*B60K 1/04* (2019.01)
*B60G 13/00* (2006.01)
(Continued)

(52) U.S. Cl.
CPC .............. *B60K 1/04* (2013.01); *B60G 13/001* (2013.01); *B60N 2/005* (2013.01); *B60N 2/012* (2013.01); *B62D 21/02* (2013.01); *B62D 25/20* (2013.01); *B60K 2001/0433* (2013.01); *B60Y 2306/01* (2013.01)

(58) Field of Classification Search
CPC .. B60K 1/04; B60K 2001/0433; B60N 2/012; B60N 2/005; B62D 25/20; B62D 21/02; B60G 13/001
See application file for complete search history.

(56) References Cited

U.S. PATENT DOCUMENTS 5,501,289 A \* 3/1996 Nishikawa ............... B60K 1/04
180/68.5
6,978,855 B2 \* 12/2005 Kubota .................... B60K 1/04
180/65.1
(Continued)

FOREIGN PATENT DOCUMENTS

JP 2003-118649 4/2003
JP 2008-239067 A 10/2008
(Continued)

*Primary Examiner* — Jacob B Meyer
(74) *Attorney, Agent, or Firm* — Oblon, McClelland, Maier & Neustadt, L.L.P.

(57) ABSTRACT

A vehicle lower section structure includes: a pair of rear side-members that is disposed in a vehicle lower section so as to be separated from each other in a vehicle width direction, and that are extending in a vehicle front-rear direction; a first cross-member extending in the vehicle width direction, to which the rear side-members joined; a second cross-member extending in the vehicle width direction at the rear of the first cross-member in the vehicle front-rear direction, to which the rear side-members joined; and a battery that is housed in a housing section surrounded by the rear side-members, the first cross-member, and the second cross-member, at least part of the battery overlapping with the rear side-members when viewed along the vehicle width direction, and at least part of the battery overlapping with the first cross-member and the second cross-member when viewed along the vehicle front-rear direction.

7 Claims, 10 Drawing Sheets

(51) Int. Cl.
  *B60N 2/005*   (2006.01)
  *B62D 21/02*   (2006.01)
  *B62D 25/20*   (2006.01)
  *B60N 2/01*    (2006.01)

(56) References Cited

U.S. PATENT DOCUMENTS

| | | | |
|---|---|---|---|
| 7,051,825 B2 * | 5/2006 | Masui | B60K 1/04 180/65.1 |
| 7,614,473 B2 * | 11/2009 | Ono | B60K 1/04 180/291 |
| 8,393,426 B2 * | 3/2013 | Takahashi | B60K 1/04 180/68.5 |
| 8,469,129 B2 * | 6/2013 | Mildner | B60K 1/04 180/68.5 |
| 8,783,402 B2 * | 7/2014 | Ogihara | B60L 11/1877 180/68.5 |
| 8,939,242 B2 * | 1/2015 | Kurakawa | H01M 2/1083 180/65.1 |
| 9,027,684 B2 * | 5/2015 | Araki | B60K 1/04 180/311 |
| 9,033,405 B2 * | 5/2015 | Hirooka | B62D 25/20 296/193.07 |
| 9,227,582 B2 * | 1/2016 | Katayama | B60K 1/04 |
| 9,242,540 B2 * | 1/2016 | Shirooka | B60K 1/04 |
| 9,259,998 B1 * | 2/2016 | Leanza | B60K 1/04 |
| 9,283,838 B2 * | 3/2016 | Ohashi | B60K 1/04 |
| 9,637,177 B2 * | 5/2017 | Kang | B62D 25/2036 |
| 9,688,314 B2 * | 6/2017 | Ajisaka | B62D 25/20 |
| 9,944,173 B2 * | 4/2018 | Ajisaka | B60K 13/04 |
| 9,956,861 B2 * | 5/2018 | Nomura | B60K 1/04 |
| 2005/0211496 A1 * | 9/2005 | Ito | B60K 15/063 180/314 |
| 2011/0284299 A1 * | 11/2011 | Takahashi | B60K 1/04 180/65.21 |
| 2011/0300427 A1 * | 12/2011 | Iwasa | B60K 1/04 429/99 |
| 2012/0073888 A1 * | 3/2012 | Taneda | B60K 1/04 180/68.5 |
| 2013/0175829 A1 * | 7/2013 | Kim | B60K 1/04 296/204 |
| 2014/0117716 A1 * | 5/2014 | Patberg | B62D 21/157 296/187.08 |
| 2014/0124277 A1 * | 5/2014 | Kurakawa | H01M 2/1083 180/65.1 |
| 2014/0262573 A1 * | 9/2014 | Ito | B60K 1/04 180/68.5 |
| 2014/0338999 A1 * | 11/2014 | Fujii | B60K 1/04 180/68.5 |
| 2016/0229454 A1 * | 8/2016 | Kang | B62D 25/20 |
| 2017/0106743 A1 * | 4/2017 | Ajisaka | B60K 13/04 |
| 2017/0166048 A1 * | 6/2017 | Saeki | B60K 15/063 |
| 2017/0217296 A1 * | 8/2017 | Nomura | B60K 1/04 |
| 2018/0050606 A1 * | 2/2018 | Sugitate | B60K 1/04 |
| 2018/0126835 A1 * | 5/2018 | Saeki | B60G 13/001 |
| 2018/0290531 A1 * | 10/2018 | Ajisaka | B60K 1/04 |

FOREIGN PATENT DOCUMENTS

| | | |
|---|---|---|
| JP | 2011-126439 | 6/2011 |
| JP | 2013-60195 | 4/2013 |
| JP | 2013-244764 | 12/2013 |
| JP | 2014-504569 | 2/2014 |
| JP | 2014-58249 A | 4/2014 |
| JP | 2016-52862 A | 4/2016 |

\* cited by examiner

VEHICLE LOWER SECTION STRUCTURE

CROSS-REFERENCE TO RELATED APPLICATION

This application is based on and claims priority under 35 USC 119 from Japanese Patent Application No. 2016-217458 filed on Nov. 7, 2016, the disclosure of which is incorporated by reference herein.

BACKGROUND

Technical Field

The present disclosure relates to a vehicle lower section structure.

Related Art

A structure of a battery mounted vehicle is described in Japanese Patent Application Laid-Open (JP-A) No. 2011-126439. In the battery mounted vehicle, a battery is disposed in a vehicle vertical direction above a center cross-member, and at the front of a rear cross-member in a vehicle front-rear direction. A seat frame for a rear seat is fixed to an upper portion of the battery using a bracket.

There are vehicle lower section structures that have no framework member for the vehicle body provided at part of the periphery of a battery installed in the vehicle body. In such a vehicle lower section structure, in cases in which deformation of the vehicle body has occurred during a collision, there is a possibility of contact between the deformed vehicle body and the battery at the location where no framework member is provided, and a possibility of the battery being deformed. There is thus room for improvement in vehicle lower section structures to prevent such battery deformation.

SUMMARY

In consideration of the above circumstances, the present disclosure provides a vehicle lower section structure capable of suppressing deformation of a battery.

A first aspect of the present disclosure is a vehicle lower section structure including a pair of rear side-members that is disposed in a vehicle lower section so as to be separated from each other in a vehicle width direction, the pair of rear side-members each extending in a vehicle front-rear direction; a first cross-member extending in the vehicle width direction, with the pair of rear side-members joined to the first cross-member; a second cross-member extending in the vehicle width direction at a rear side of the first cross-member in the vehicle front-rear direction, with the pair of rear side-members joined to the second cross-member; and a battery that is housed in a housing section surrounded by the pair of rear side-members, the first cross-member, and the second cross-member, at least part of the battery overlapping with the pair of rear side-members when viewed along the vehicle width direction, and at least part of the battery overlapping with the first cross-member and the second cross-member when viewed along the vehicle front-rear direction.

In the vehicle lower section structure of the present aspect, when viewed along the vehicle vertical direction, the battery is surrounded by the first cross-member and the second cross-member respectively disposed at the front and at the rear of the battery in the vehicle front-rear direction, and by the pair of rear side-members respectively disposed at the outer side of the battery in the vehicle width direction. Further, at least part of the battery overlaps with the pair of rear side-members when viewed along the vehicle width direction, and at least part of the battery overlaps with the first cross-member and the second cross-member when viewed along the vehicle front-rear direction. Namely, the first cross-member, the second cross-member, and the pair of rear side-members serving as vehicle framework members are present surrounding the battery.

During a vehicle collision from the side, collision load that has been input to one of the rear side-members is transmitted to the other rear side-member through at least one of the first cross-member and the second cross-member. Further, during a vehicle frontal collision, collision load that has been input to the first cross-member is transmitted to the second cross-member through at least one of the pair of rear side-members.

Moreover, during a vehicle rear-end collision, collision load that has been input to the second cross-member is transmitted to the first cross-member through at least one of the pair of rear side-members. Deformation of the first cross-member, the second cross-member, and the pair of rear side-members is accordingly suppressed during a vehicle collision due to collision load being distributed and transmitted to the first cross-member, the second cross-member, and the pair of rear side-members in this manner. The first cross-member, the second cross-member, and the pair of rear side-members are therefore not as liable to contact the battery compared to a configuration in which the battery is not housed in the housing section, thereby enabling deformation of the battery to be suppressed.

The vehicle lower section structure according to the present aspect of the disclosure may further include a reinforcement member, the reinforcement member including: a main body disposed in a vehicle vertical direction above the battery; a first coupling portion formed at a front side of the main body in the vehicle front-rear direction and coupled to the first cross-member; and a second coupling portion formed at a rear side of the main body in the vehicle front-rear direction and coupled to the second cross-member.

In the vehicle lower section structure configured as described above, the reinforcement member connects the first cross-member and the second cross-member together. Accordingly, during a frontal collision of the vehicle, collision load that has been input to the first cross-member is transmitted to the second cross-member through the reinforcement member in addition to through the rear side-members. During a rear-end collision of the vehicle, collision load that has been input to the first cross-member is transmitted to the second cross-member through the reinforcement member in addition to through the rear side-members. Moreover, during a collision from the side of the vehicle, part of the collision load that has been input to the rear side-member on one side is transmitted to the rear side-member on the other side through the reinforcement member in addition to through the first cross-member and the second cross-member. Due to the reinforcement member configuring part of the transmission path for collision load, deformation of the first cross-member, the second cross-member, and the pair of rear side-members is accordingly suppressed, enabling deformation of the battery to also be suppressed.

A reinforcement member of a vehicle lower section structure of the present aspect may be configured with the reinforcement member having a profile such that the main body is positioned in the vehicle vertical direction above the first coupling portion and the second coupling portion when viewed along the vehicle width direction.

In the vehicle lower section structure configured as described above, the reinforcement member has a profile protruding upward in the vehicle vertical direction when viewed along the vehicle width direction. The volume of the housing section surrounded by the first cross-member, the second cross-member, the pair of rear side-members, and the reinforcement member may accordingly be increased compared to a configuration in which the reinforcement member is formed in a straight line shape.

The reinforcement member of a vehicle lower section structure of the present aspect may be configured such that the reinforcement member is a seat frame to install a seat thereon.

In the vehicle lower section structure configured as described above, the seat frame is not only employed as a member to install the seat on, but also employed as a reinforcement member. The number of components is accordingly reduced, enabling a reduction in weight of the vehicle to be achieved.

In the housing section of the vehicle lower section structure of the present aspect, a floor panel may be provided including a bottom portion extending in the vehicle front-rear direction below the battery in the vehicle vertical direction, and an inclined portion extending diagonally upward toward a rear side from a rear edge of the bottom portion in the vehicle front-rear direction. The second cross-member may also be arranged on the inclined portion.

In the vehicle lower section structure configured as described above, in order to dispose part of the rear side-members offset with respect to the bottom portion of the floor panel, the second cross-member is arranged on the inclined portion of the floor panel such that the height of the rear side-members and the height of the second cross-member are substantially aligned with each other. The second cross-member accordingly does not need to have a profile in which end portions at each vehicle width direction end thereof are offset in the vehicle vertical direction relative to a central portion thereof. Namely, the second cross-member may be disposed in a straight line along the vehicle width direction, enabling the size of the second cross-member to be smaller than in a configuration in which the second cross-member is offset, enabling a reduction in weight of the vehicle to be achieved.

In the vehicle lower section structure of the present aspect, the vehicle lower section may further include a rear suspension member installed with a rear shock absorber, and a third cross-member extending along the vehicle width direction with the pair of rear side-members joined to the third cross-member, the third cross-member being configured to bear force input from the rear shock absorber to the pair of rear side-members through the rear suspension member; and the second cross-member is disposed at a front side of the third cross-member in the vehicle front-rear direction.

In the vehicle lower section structure configured as described above, the second cross-member is disposed further at the front of the third cross-member in the vehicle front-rear direction. In other words, the second cross-member is disposed as a separate body to the third cross-member. The third cross-member bears force input from the rear shock absorber to the rear side-members through the rear suspension member. Deformation of the vehicle lower section structure may accordingly be suppressed compared to a configuration in which the second cross-member and the third cross-member are integrated together.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
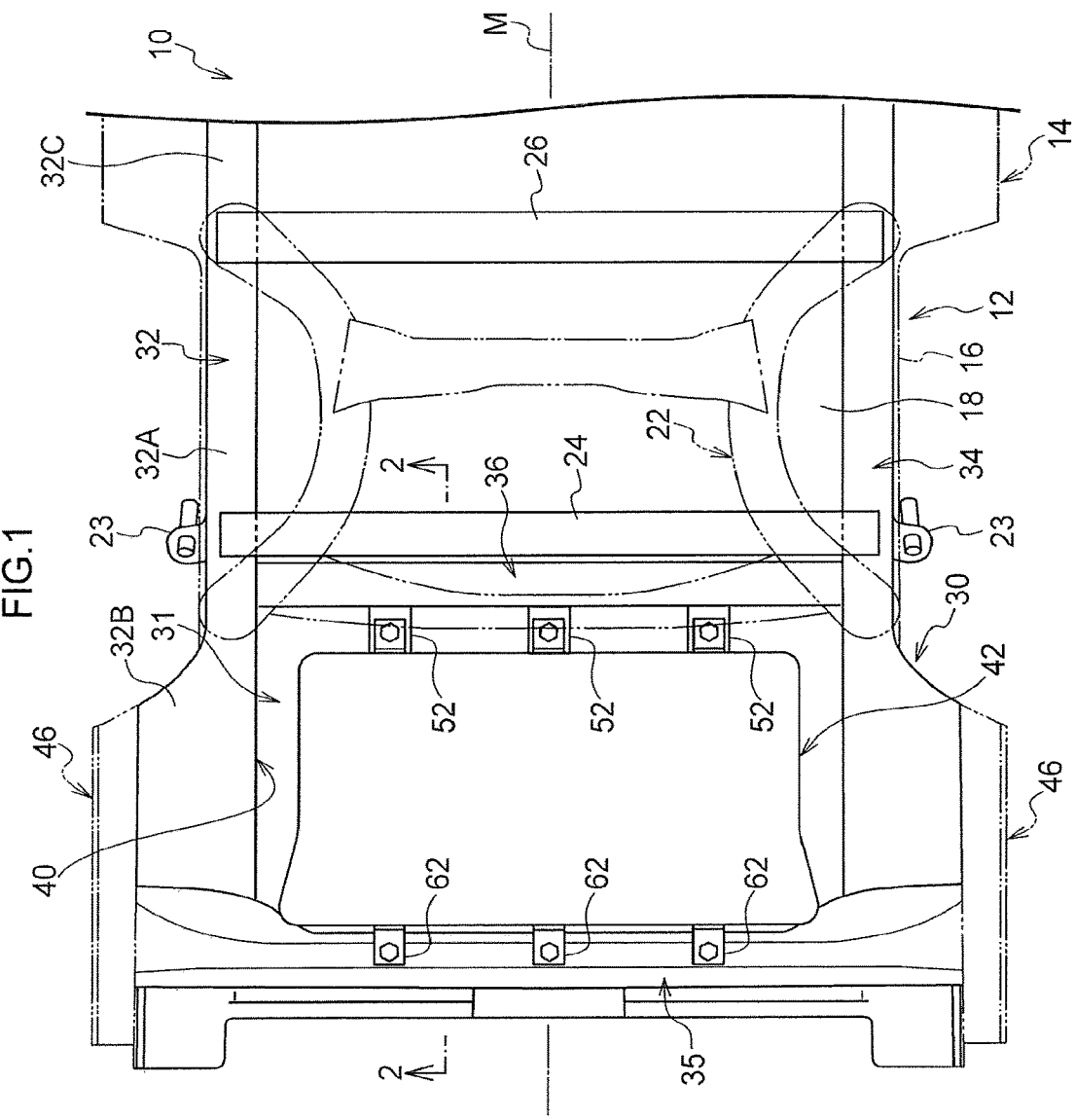
FIG. 1 is a plan view of a vehicle lower section structure according to a first exemplary embodiment.

Explanation follows regarding a vehicle lower section structure according to a first exemplary embodiment. In the drawings arrows FR indicate forward (the direction of progress) for a vehicle, arrows RR indicate rearward for the vehicle, arrows UP indicate upward, and arrows W indicate a vehicle width direction. Moreover, in the following, unless particularly stated otherwise, when explanation is given referring simply to front/rear, left/right, or up/down directions, these indicate front/rear in the vehicle front-rear direction, left/right in the vehicle width direction when facing in the direction of progress, and up/down in the vehicle vertical direction.

FIG. 1 illustrates part of a vehicle lower section 12 of a vehicle 10 of the first exemplary embodiment, from a central portion to a rear portion of the vehicle lower section 12 in the vehicle front-rear direction. The vehicle 10 is applied with a vehicle lower section structure 30, described later, and, for example, is a hybrid vehicle including motive power sources of an engine and an electrical motor. The position of a line representing the vehicle width direction center of the vehicle 10 is referred to as center line M. The vehicle 10 includes a vehicle body 14. A rear floor panel 18 is provided to a rear under body 16, which is a rear section of the vehicle body 14. The rear floor panel 18 is plate shaped, and extends in both the vehicle front-rear direction and the vehicle width direction so as to cover the vehicle lower section 12.

The rear floor panel 18 is, for example, formed by pressing sheet steel. Rear suspension members 22 are provided in the vehicle vertical direction below the rear floor panel 18. Rear shock absorbers 23 are respectively provided to the rear suspension members 22 to damp vibration from rear wheels, not illustrated in the drawings. Suspension cross-members 24, 26 are provided in the vehicle vertical direction above the rear suspension members 22.

The suspension cross-member 24 is an example of a third cross-member, and has its longitudinal direction extending in the vehicle width direction. Rear side-members 32, 34, described later, are respectively joined to the two vehicle width direction end portions of the suspension cross-members 24. Spot welding or laser welding is employed in the present exemplary embodiment as the method for joining each member; however, the joining method is not limited to spot welding or laser welding. The joining method may be fastening using a fastening member, or bonding using an adhesive in the case of a resin body. The suspension cross-member 24 is configured to bear force input from the rear shock absorbers 23 to the rear side-members 32, 34 through the rear suspension members 22.

Figure 2:
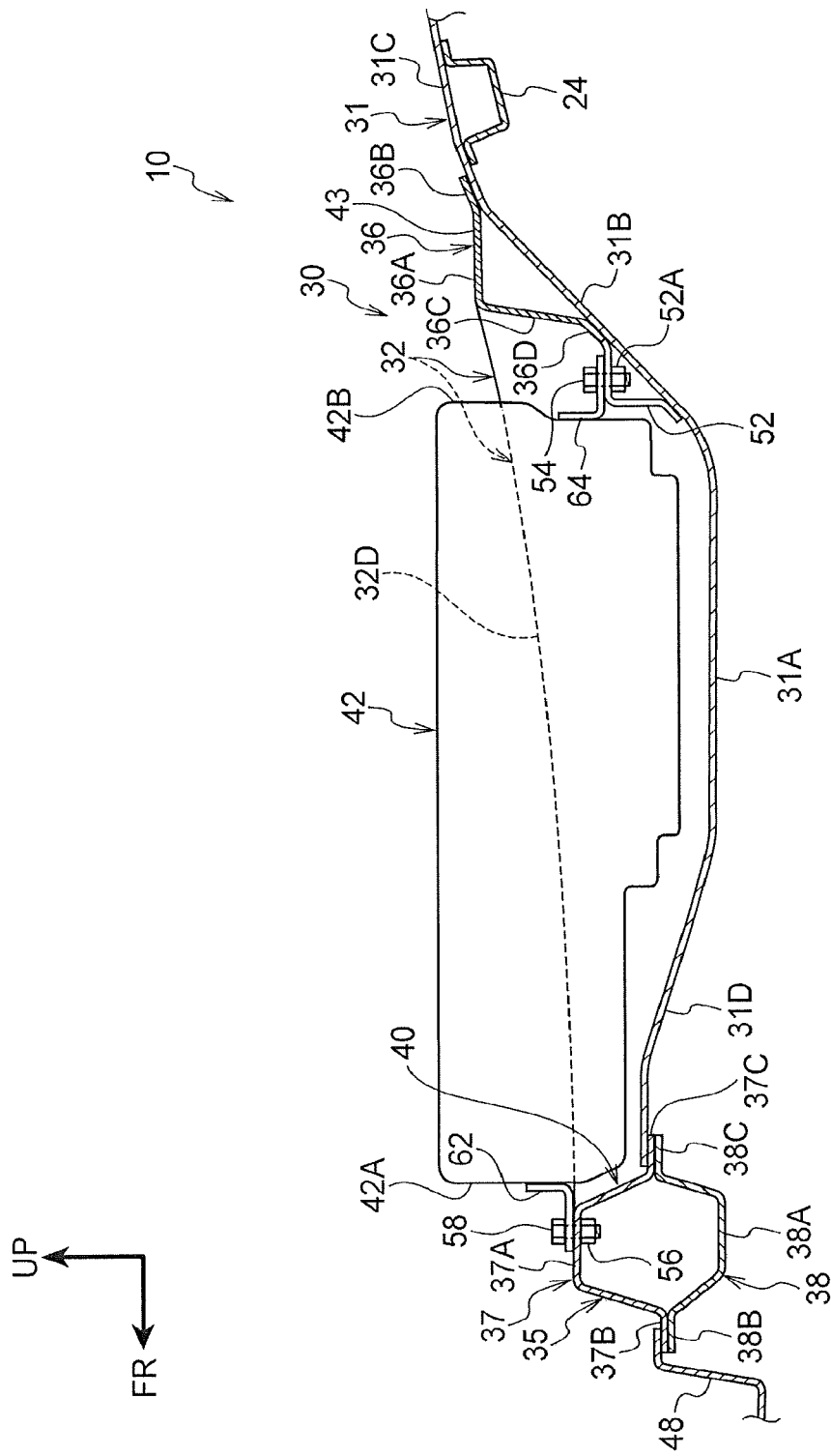
FIG. 2 is a vertical cross-section of the vehicle lower section structure according to the first exemplary embodiment (a cross-section taken along the line 2-2 of FIG. 1)

As illustrated in FIG. 2, a center floor panel 31, described later, is disposed in the vehicle vertical direction above the suspension cross-member 24. The suspension cross-member 24 has a cross-section profile formed in a hat shape open toward the vehicle upper side, when viewed along the vehicle width direction. Front and rear flanges provided at the open side of the suspension cross-member 24 are joined to a lower face of the center floor panel 31. Namely, the suspension cross-member 24 forms a closed cross-section together with the center floor panel 31 when viewed along the vehicle width direction.

As illustrated in FIG. 1, the suspension cross-member 26 is disposed at in the vehicle front-rear direction at the rear of the suspension cross-member 24, and has its longitudinal direction extending along the vehicle width direction. Two width direction end portions of the suspension cross-member 26 are respectively joined to the rear side-members 32, 34, described later. The rear floor panel 18 is disposed in the vehicle vertical direction above the suspension cross-member 26. The suspension cross-member 26 forms a closed cross-section together with the rear floor panel 18 when viewed along the vehicle width direction.

Vehicle Lower Section Structure

Next, explanation follows regarding the vehicle lower section structure 30.

As illustrated in FIG. 1, the vehicle lower section structure 30 includes the rear side-members 32, 34 serving as an example of a pair of rear side-members, a first cross-member 35, a second cross-member 36, and a battery 42. The vehicle lower section structure 30 includes the rear suspension members 22, the rear shock absorbers 23, and the suspension cross-member 24.

The rear side-members 32, 34, the first cross-member 35, and the second cross-member 36 configure framework members of the vehicle body 14, and are arranged in a substantially lattice shape when viewed in the vehicle vertical direction. Locations surrounded by the rear side-members 32, 34, the first cross-member 35, and the second cross-member 36, and including the rear side-members 32, 34, the first cross-member 35, and the second cross-member 36, are referred to as a housing section 40. The center floor panel 31 is provided in the housing section 40 below the battery 42, described later, and serves as an example of a floor panel.

Center Floor Panel

Figure 3:
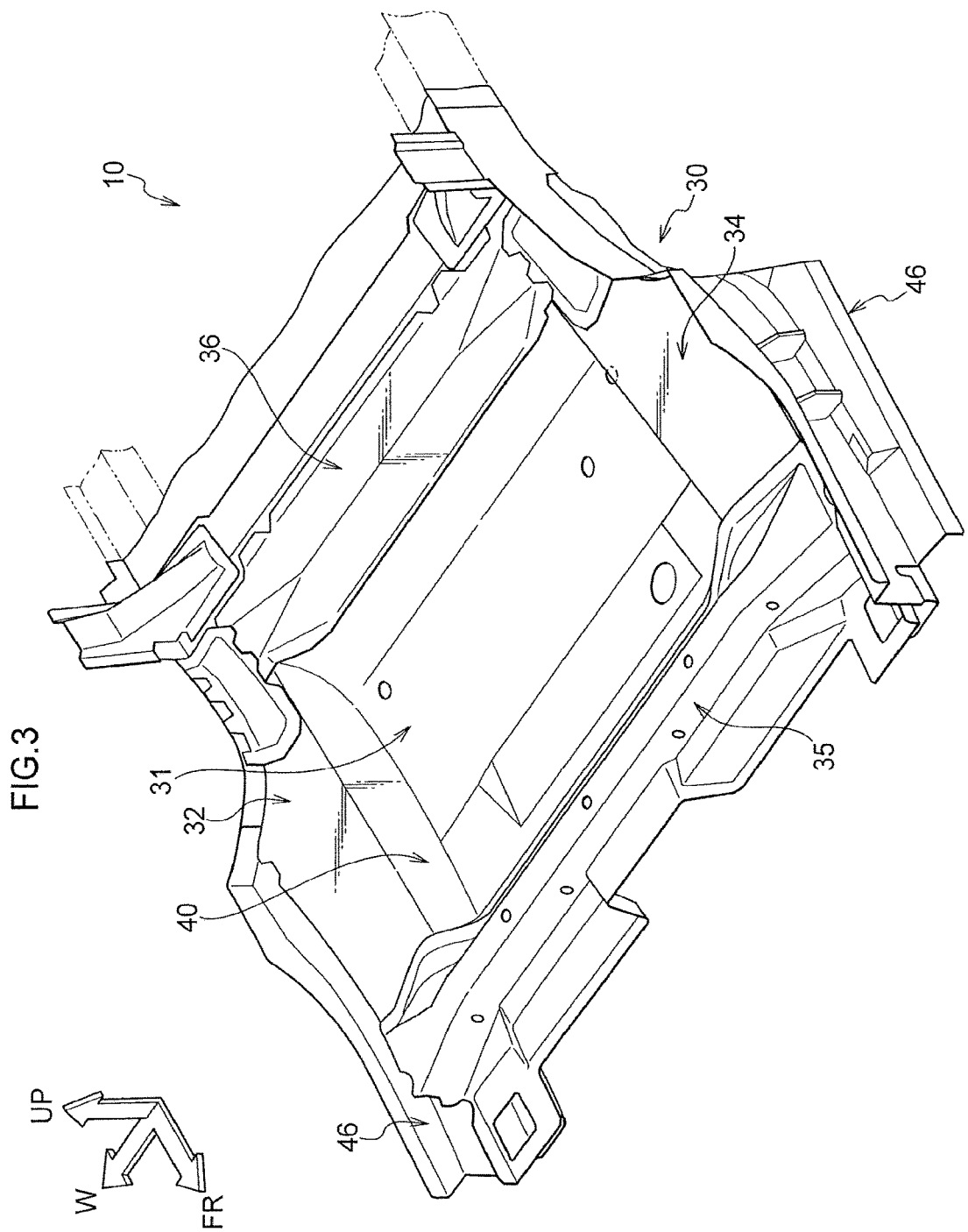
FIG. 3 is a perspective view of the vehicle lower section structure according to the first exemplary embodiment, illustrating a state in which a battery has been removed.

As illustrated in FIG. 3, the center floor panel 31 extends in both the vehicle front-rear direction and the vehicle width direction. Moreover, as illustrated in FIG. 2, the center floor panel 31 includes a bottom portion 31A, an inclined portion 31B, a rear portion 31C, and a front portion 31D. The bottom portion 31A extends in the vehicle front-rear direction below the battery 42 in the vehicle vertical direction. The inclined portion 31B extends diagonally upward and rearward from a rear edge of the bottom portion 31A in the vehicle front-rear direction. The rear portion 31C extends rearward from a rear edge (an upper edge in the vehicle vertical direction) of the inclined portion 31B. The front portion 31D extends forwards from a front edge of the bottom portion 31A in the vehicle front-rear direction. Although omitted from illustration in the drawings, a rear edge of the rear portion 31C is overlapped in the vehicle vertical direction with a front edge of the rear floor panel 18 (see FIG. 1) and joined to the front edge of the rear floor panel 18.

Brackets 52 are provided at a lower portion of the inclined portion 31B in the vehicle vertical direction, and on an upper face of the inclined portion 31B. The brackets 52 are spaced apart at three locations along the vehicle width direction, and each have a substantially L-shaped cross-section profile when viewed along the vehicle width direction. A weld nut 52A is provided to each of the brackets 52. A bolt 54 is fastened into each of the weld nuts 52A.

Rear Side-Member

As illustrated in FIG. 1, the rear side-members 32, 34 are framework members arranged in the vehicle lower section 12 so as to be separated from each other in the vehicle width direction. The rear side-members 32, 34 are disposed with left-right symmetry to the center line M. Explanation will accordingly be given regarding the rear side-member 32, and explanation regarding the rear side-member 34 will be omitted. FIG. 2 illustrates an upper face 32D of the rear side-member 32. The lower face of the rear side-member 32 is omitted from illustration in the drawings.

The rear side-member 32 illustrated in FIG. 1 is arranged at the right side of the rear under body 16. The rear side-member 32 extends along the vehicle front-rear direction, and is formed with a substantially rectangular shaped closed cross-section profile when viewed along the vehicle front-rear direction. The rear side-member 32 moreover includes, for example, a central portion 32A configuring a vehicle front-rear direction central portion, a wide section 32B formed at the front of the central portion 32A, and a rear portion 32C formed at the rear of the central portion 32A. The wide section 32B widens toward the vehicle width direction outer side, and configures locations where the width in the vehicle width direction is wider than that of the central portion 32A. Rear bumper reinforcement, not illustrated in the drawings, is fastened to the rear portion 32C.

Figure 4:
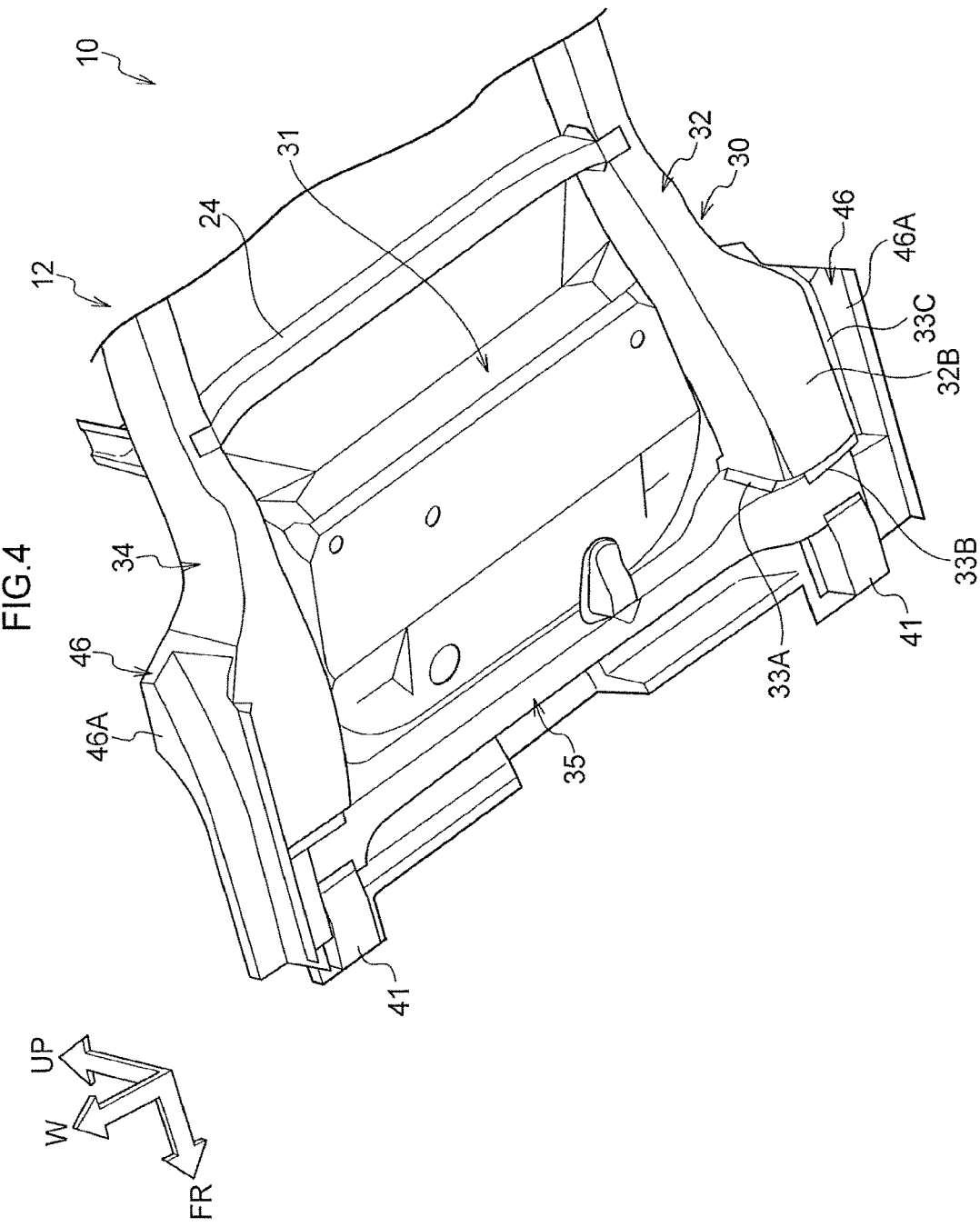
FIG. 4 is a perspective view of the vehicle lower section structure according to the first exemplary embodiment, as seen from below in the vehicle vertical direction.

As illustrated in FIG. 4, a vertical flange 33A and a horizontal flange 33B are formed, for example, at a front end portion of the wide section 32B. The vertical flange 33A protrudes toward the vehicle width direction inner side from a vertical wall running along the vehicle vertical direction of the wide section 32B. The horizontal flange 33B protrudes forward in the vehicle front-rear direction from a bottom wall at the lower side of the wide section 32B. A side flange 33C is formed to a right side portion of the wide section 32B, and protrudes toward the vehicle width direction outer side. The vertical flange 33A and the horizontal flange 33B are joined to a rear portion in the vehicle front-rear direction of the first cross-member 35, described later.

A pair of rockers 46 are respectively arranged at the vehicle width direction outer side of the rear side-members 32, 34, and extend along the vehicle front-rear direction. The rockers 46 are each configured by an inner rocker panel 46A and an outer rocker panel, not illustrated in the drawings.

First Cross-Member

The first cross-member 35 is formed in the vehicle lower section 12 in an elongated shape having its longitudinal direction along the vehicle width direction. In other words, the first cross-member 35 is a framework member extending along the vehicle width direction. Two vehicle width direction end portions of the first cross-member 35 are each joined to the respective inner rocker panel 46A.

As illustrated in FIG. 2, the first cross-member 35 is divided in the vehicle vertical direction, and includes an upper cross-member 37 and a lower cross-member 38. The first cross-member 35 has a profile of cross-section orthogonal to the vehicle width direction which is a closed cross-section formed with a substantially hexagonal shaped profile when viewed along the vehicle width direction.

The upper cross-member 37 includes a main body 37A with a substantially hat shape cross-section open toward the vehicle vertical direction lower side, when viewed along the vehicle width direction, a front flange 37B protruding from the front of the main body 37A in the vehicle front-rear direction, and a rear flange 37C protruding from the rear of the main body 37A in the vehicle front-rear direction. Three weld nuts 56 are provided to the main body 37A spaced apart at intervals along the vehicle width direction. Bolts 58 are respectively fastened into each of the weld nuts 56.

The lower cross-member 38 includes a main body 38A with a substantially hat shape cross-section open toward the vehicle vertical direction upper side, when viewed along the vehicle width direction, a front flange 38B protruding from the front of the main body 38A in the vehicle front-rear direction, and a rear flange 38C protruding from the rear of the main body 38A in the vehicle front-rear direction.

The front flange 37B and the front flange 38B, and the rear flange 37C and the rear flange 38C, are respectively overlapped with each other in the vehicle vertical direction and joined together. A rear edge of a front floor panel 48 is overlapped with the front flange 37B in the vehicle vertical direction and joined to the front flange 37B. A front edge of the front portion 31D of the center floor panel 31 is overlapped with the rear flange 37C in the vehicle vertical direction and joined to the rear flange 37C. The vertical flange 33A and the horizontal flange 33B (see FIG. 4) of the rear side-members 32 are joined to the rear side in the vehicle front-rear direction of the main body 38A of the lower cross-member 38. A rear end portion of a front side member 41 (see FIG. 4) extending along the vehicle front-rear direction is joined to the front side in the vehicle front-rear direction of the main body 38A.

Second Cross-Member

As illustrated in FIG. 1, the second cross-member 36 is formed in the vehicle lower section 12 in an elongated shape having its longitudinal direction along the vehicle width direction. In other words, the second cross-member 36 is a framework member extending along the vehicle width direction. The second cross-member 36 is disposed in the vehicle lower section 12 so as to be separated from the first cross-member 35 and at the rear of the first cross-member 35 in the vehicle front-rear direction. Moreover, the second cross-member 36 is disposed in the vicinity of the suspension cross-member 24, and further forward than the suspension cross-member 24 in the vehicle front-rear direction. Respective vehicle width direction end portions of the second cross-member 36 are joined to the rear side-members 32, 34.

As illustrated in FIG. 2, the second cross-member 36 has a profile of cross-section orthogonal to the vehicle width direction formed in substantially L-shape when viewed along the vehicle width direction. More specifically, the second cross-member 36 includes, for example, an upper wall 36A, an upper flange 36B, a vertical wall 36C, and a lower flange 36D. The upper wall 36A is formed in a plate shape along the vehicle front-rear direction. A height of an upper face 43 of the upper wall 36A is substantially aligned with a height of a rear end of the upper face 32D of the rear side-member 32. The upper flange 36B protrudes out from a rear edge of the upper wall 36A toward the vehicle rear. The vertical wall 36C extends as a plate shape from a front edge of the upper wall 36A downwards in the vehicle vertical direction. The lower flange 36D protrudes out from a lower edge of the vertical wall 36C toward the vehicle front.

The upper flange 36B is joined to an upper edge of the inclined portion 31B of the center floor panel 31. The lower flange 36D is joined to a central portion of the inclined portion 31B in the vehicle vertical direction. Namely, the second cross-member 36 is disposed on the inclined portion 31B. The second cross-member 36 forms a closed cross-section together with the center floor panel 31, with the closed cross-section having a substantially triangular shaped profile when viewed along the vehicle width direction.

Battery

The battery 42 is formed with a substantially cuboid shape that is long in the vehicle width direction, and internally stores electrical power. A single battery 42 is housed in the housing section 40 above the center floor panel 31 in the vehicle vertical direction. A rear seat, not illustrated in the drawings, is disposed above the battery 42. The battery 42 is connected to each section of the vehicle 10 through a harness, not illustrated in the drawings, and supplies electrical power to each section.

As illustrated in FIG. 1, the vehicle front-rear direction dimension of the battery 42 is set shorter than the vehicle front-rear direction dimension between the first cross-member 35 and the second cross-member 36. The vehicle width direction dimension of the battery 42 is set shorter than the vehicle width direction dimension between the rear side-member 32 and the rear side-member 34. As illustrated in FIG. 2, the vehicle vertical direction dimension of the battery 42 is, for example, set longer than the vehicle vertical direction dimension of the first cross-member 35, and longer than the vehicle vertical direction dimension of the second cross-member 36.

Three front brackets 62 are fixed to a front face 42A of the battery 42, spaced apart from each other along the vehicle width direction. The cross-section profiles of the front brackets 62 are substantially L-shaped when viewed along the vehicle width direction. The front brackets 62 are attached to the first cross-member 35 by bolts 58 being fastened into weld nuts 56.

Three rear brackets 64 are fixed to a rear face 42B of the battery 42, spaced apart from each other along the vehicle width direction. The cross-section profiles of the rear brackets 64 are substantially L-shaped when viewed along the vehicle width direction. The rear brackets 64 are respectively attached to the brackets 52 by the bolts 54 being fastened into the weld nuts 52A. The battery 42 is accordingly fixed to the housing section 40 by the three bolts 54 and the three bolts 58. A portion of the battery 42 lower than approximately the center of the battery 42 in the vehicle vertical direction overlaps with the rear side-members 32, 34 (see FIG. 1) when viewed along the vehicle width direction.

As illustrated in FIG. 1, the first cross-member 35 and the second cross-member 36 are respectively disposed at the front and the rear of the battery 42 in the vehicle front-rear direction, when the vehicle lower section structure 30 is viewed along the vehicle vertical direction. The rear side-members 32, 34 are respectively arranged at the outer side of the battery 42 in the vehicle width direction. The battery 42 is accordingly surrounded by the first cross-member 35, the second cross-member 36, and the rear side-members 32, 34 when viewed along the vehicle vertical direction.

Figure 5:
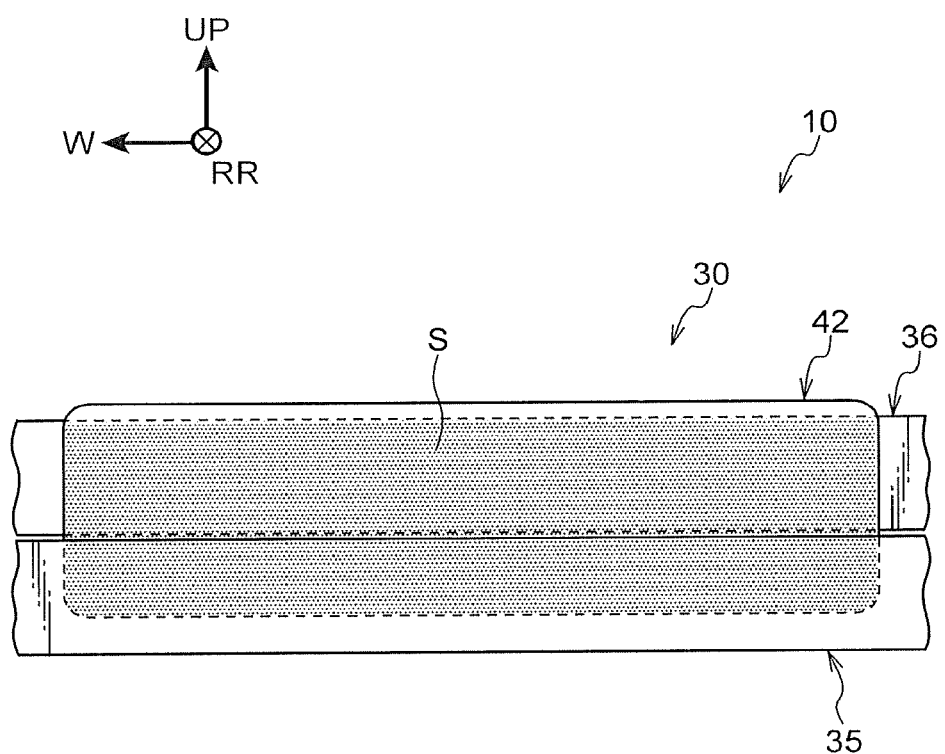
FIG. 5 is an explanatory diagram of the battery, a first cross-member, and a second cross-member according to the first exemplary embodiment, as viewed along the vehicle front-rear direction.

As illustrated in FIG. 5, in the battery 42, a portion below approximately the center of the battery 42 in the vehicle vertical direction overlaps with the first cross-member 35 when viewed along the vehicle front-rear direction, and a portion above approximately the center overlaps with the second cross-member 36. In FIG. 5, the region where the battery 42 overlaps with the first cross-member 35 or the second cross-member 36 when viewed along the vehicle front-rear direction is illustrated by shading. This shaded region is referred to as region S.

Operation

Next, explanation follows regarding operation and effects of the vehicle lower section structure 30 of the first exemplary embodiment.

Figure 6:
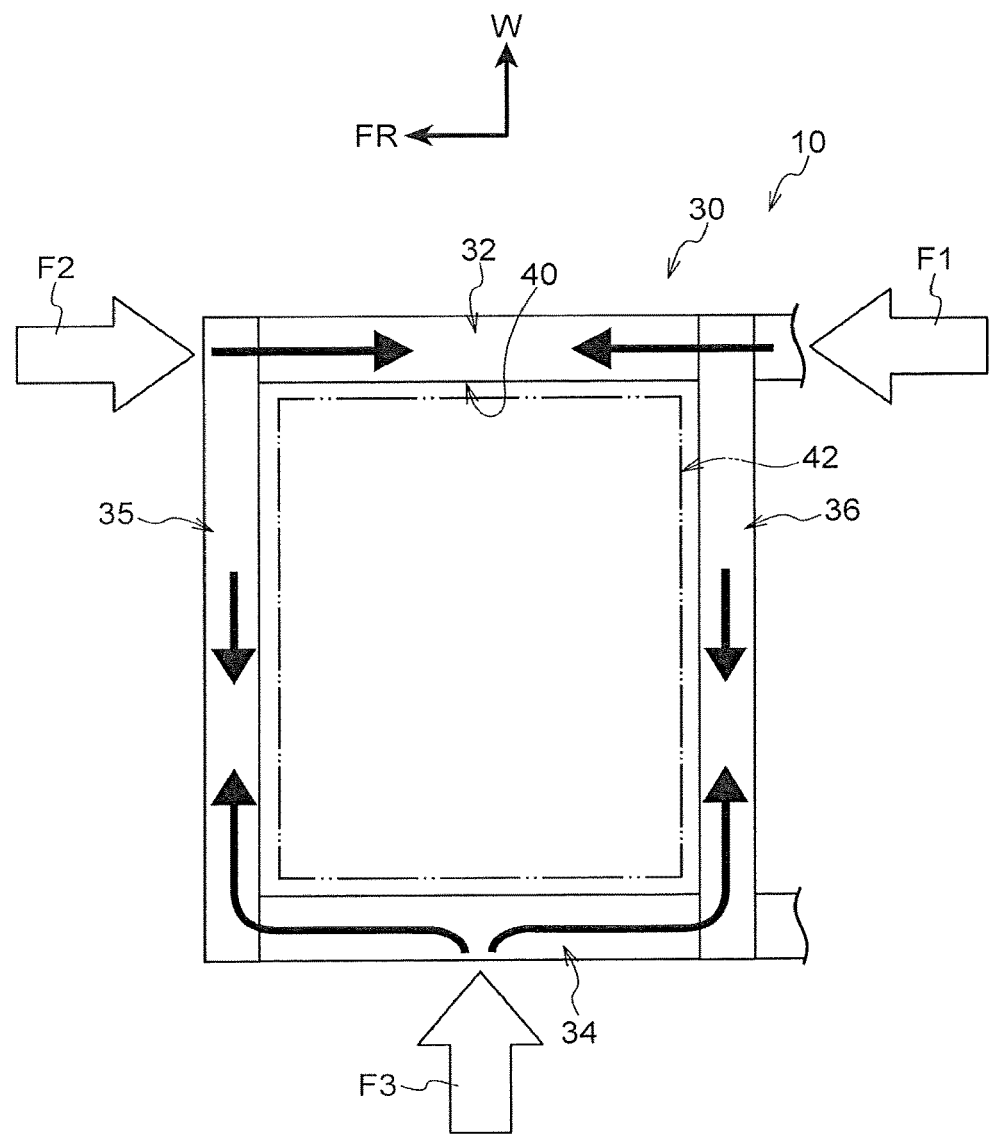
FIG. 6 is an explanatory diagram illustrating a state in which load acts on the vehicle lower section structure according to the first exemplary embodiment.

FIG. 6 schematically illustrates the rear side-members 32, 34, the first cross-member 35, and the second cross-member 36 of the vehicle lower section structure 30, and the battery 42.

During a collision of the vehicle 10 (during a frontal collision, a rear-end collision, or a collision from the side), members other than the rear side-members 32, 34, the first cross-member 35, and the second cross-member 36 may deform toward the battery 42. The battery 42 is, however, housed in the housing section 40, and surrounded by the rear side-members 32, 34, the first cross-member 35, and the second cross-member 36. The other members that have deformed toward the battery 42 therefore make contact with at least one member of the rear side-members 32, 34, the first cross-member 35, or the second cross-member 36. In the vehicle lower section structure 30, contact of other members with the battery 42 is accordingly avoided compared to a configuration in which the battery 42 is not housed in the housing section 40, thereby enabling deformation of the battery 42 to be suppressed.

In the vehicle lower section structure 30, when a collision load F1 is input to the vehicle rear section of the vehicle 10 during a rear-end collision, the collision load F1 from the rear side-member 32, for example, is distributed and transmitted to the second cross-member 36 or the first cross-member 35. Transmission modes of the collision load are indicated by black arrows. In the vehicle lower section structure 30, when a collision load F2 is input to the vehicle front section of the vehicle 10 during a frontal collision, the collision load F2 is, for example, distributed and transmitted to the rear side-member 32 or the first cross-member 35.

Moreover, in the vehicle lower section structure 30, when a collision load F3 is input to a vehicle side section (for example, to a left side portion) of the vehicle 10 during a collision from the side, the collision load F3 is, for example, distributed and transmitted from the rear side-member 34 to the first cross-member 35 and the second cross-member 36. In this manner, respective collision loads during each type of collision are distributed and transmitted in the vehicle lower section structure 30 to the rear side-members 32, 34, the first cross-member 35, and the second cross-member 36. Localized concentration of collision load on a single portion of the housing section 40 is accordingly avoided. Namely, deformation of the first cross-member 35, the second cross-member 36, and the rear side-members 32, 34 is suppressed, such that they are not liable to make contact with the battery 42.

As described above, in the vehicle lower section structure 30, the first cross-member 35, the second cross-member 36, and the rear side-members 32, 34 are less liable to make contact with the battery 42 than in a configuration not housing the battery 42 in the housing section 40. Deformation of the battery 42 may accordingly be suppressed in the vehicle lower section structure 30. In the vehicle lower section structure 30, due to collision load being distributed and transmitted, the rear side-members 32, 34, the first cross-member 35, and the second cross-member 36 each need only a small resiliency to collision load, enabling weight reductions to be achieved in each member.

As illustrated in FIG. 2, in the vehicle lower section structure 30, for example, part of the rear side-member 32 is disposed offset in the vehicle vertical direction above the bottom portion 31A of the center floor panel 31. In the vehicle lower section structure 30, the height of the upper face 32D of the rear side-member 32 and the height of the upper face 43 of the second cross-member 36 are substantially aligned with each other by arranging the second cross-member 36 on the inclined portion 31B of the center floor panel 31. The second cross-member 36 accordingly does not need to have a profile in which end portions at each vehicle width direction end thereof are offset in the vehicle vertical direction above a central portion thereof. Namely, the second cross-member 36 may be disposed in a straight line along the vehicle width direction, enabling the size of the second cross-member 36 to be smaller than in a configuration in which the second cross-member 36 is offset, enabling a reduction in weight of the vehicle to be achieved.

In the vehicle lower section structure 30 illustrated in FIG. 1, the second cross-member 36 is disposed further toward the front than the suspension cross-member 24 in the vehicle front-rear direction. In other words, the second cross-member 36 is disposed as a separate body to the suspension cross-member 24. Thus, when the vehicle 10 is being driven, the suspension cross-member 24 bears force input from the rear shock absorbers 23 to the rear side-members 32, 34 through the rear suspension members 22. Deformation of the vehicle lower section structure 30 may accordingly be suppressed compared to a configuration in which the second cross-member 36 and the suspension cross-member 24 are integrated together.

Second Exemplary Embodiment

Next, explanation follows regarding a vehicle lower section structure according to a second exemplary embodiment. Components and portions having similar function to those of the vehicle lower section structure 30 according to the first exemplary embodiment described above are appended with the same reference signs to those employed in the first exemplary embodiment, and explanation thereof is omitted.

Figure 7:
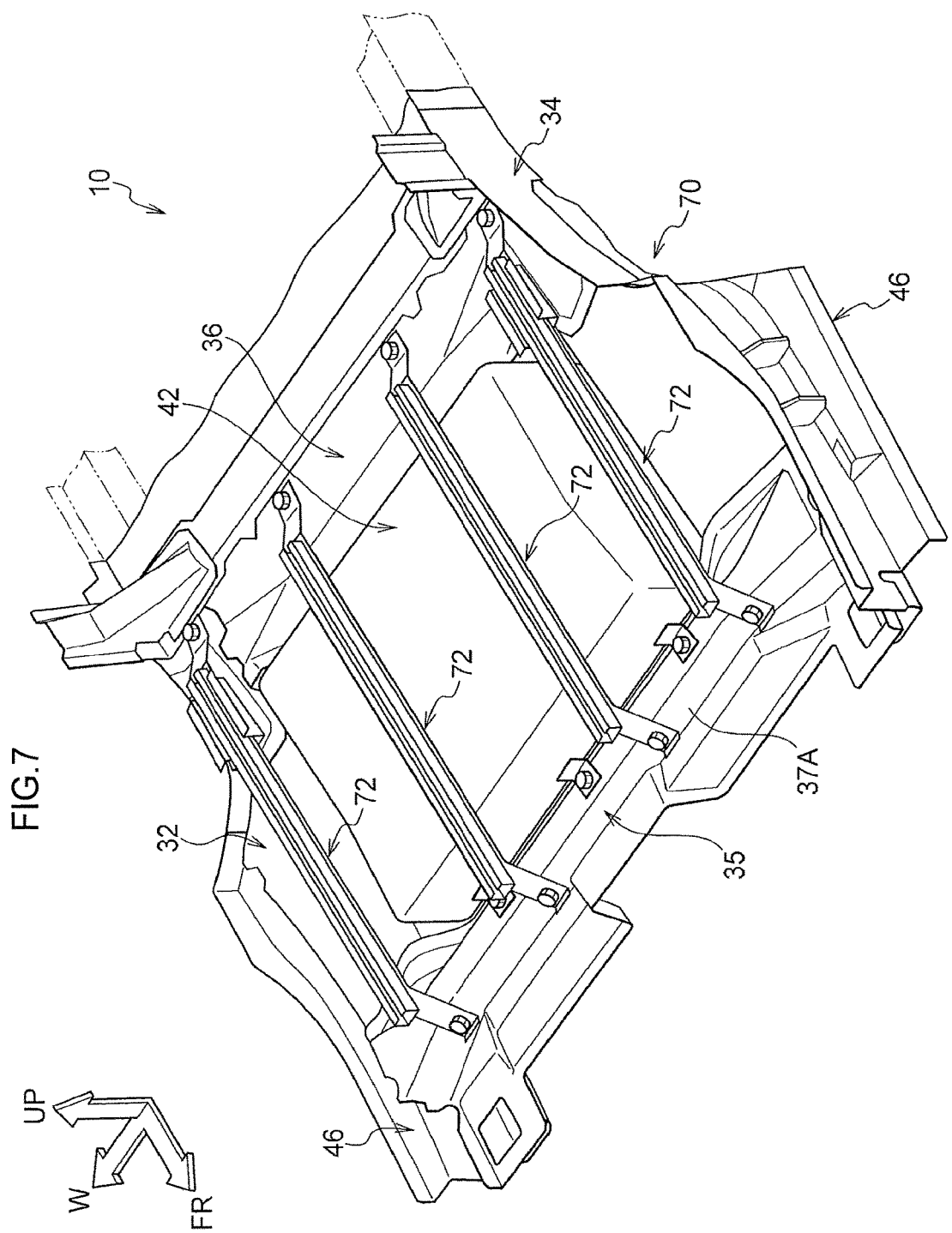
FIG. 7 is a perspective view of a vehicle lower section structure according to a second exemplary embodiment.
Figure 8:
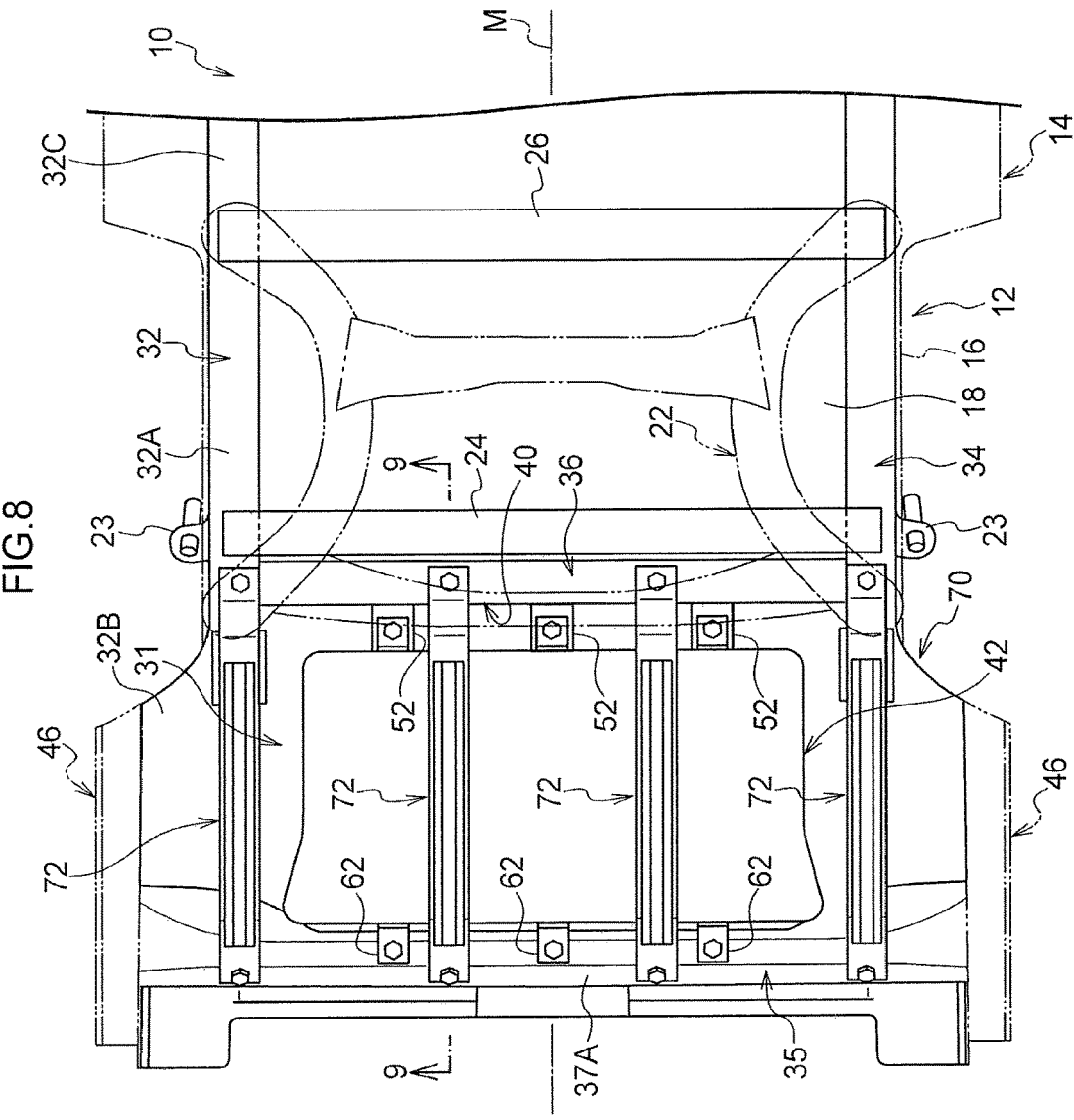
FIG. 8 is a plan view of the vehicle lower section structure according to the second exemplary embodiment.
Figure 9:
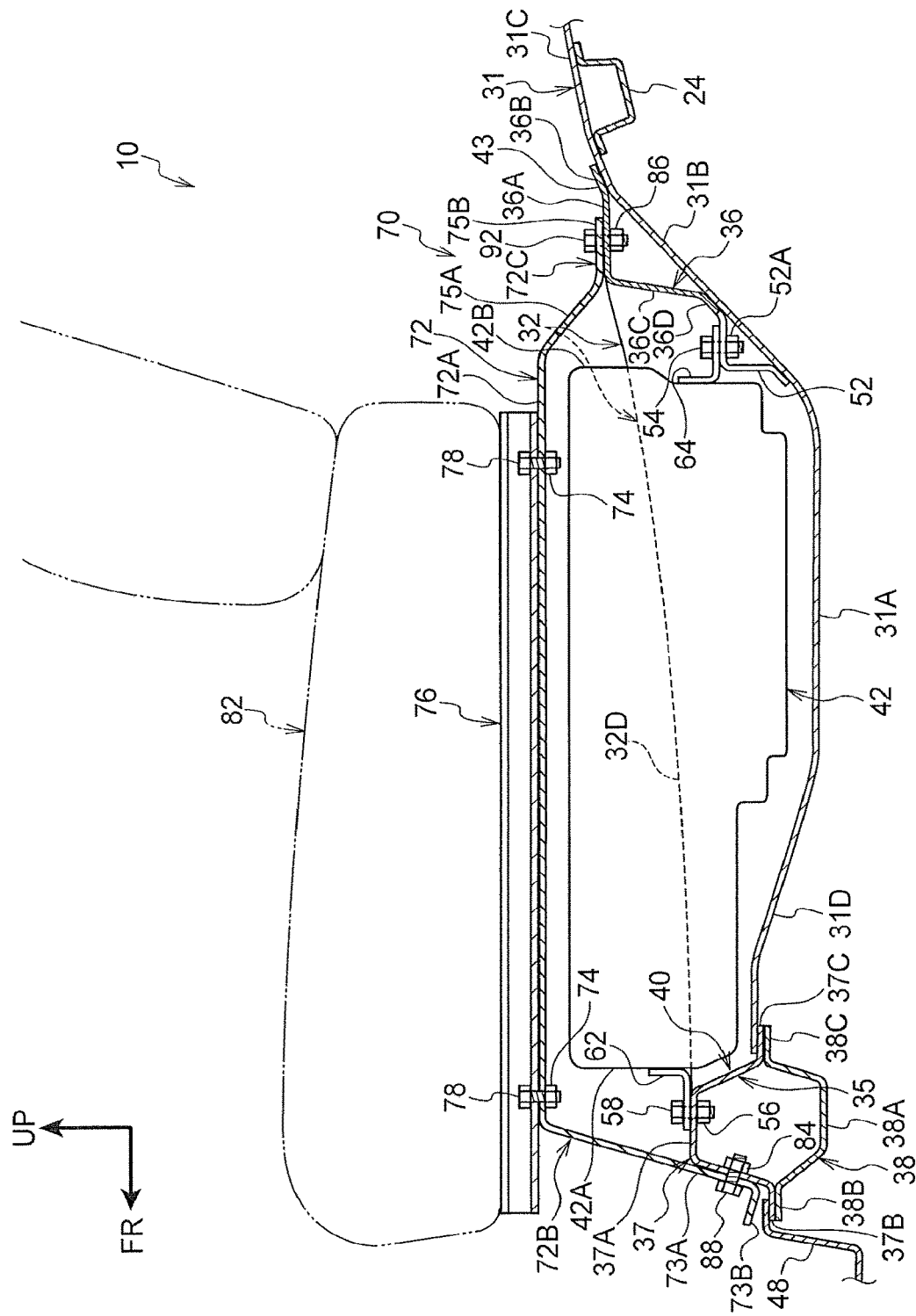
FIG. 9 is vertical cross-section of the vehicle lower section structure according to the second exemplary embodiment (a cross-section taken along line 9-9 of FIG. 8)

FIG. 7 and FIG. 8 illustrate a vehicle lower section structure 70 applied to a vehicle 10, as an example of the second exemplary embodiment. The vehicle lower section structure 70 includes rear side-members 32, 34, a first cross-member 35, a second cross-member 36, a battery 42, and seat frames 72. The vehicle lower section structure 70 includes rear suspension members 22, rear shock absorbers 23, and a suspension cross-member 24. As illustrated in FIG. 9, weld nuts 84 are provided on an inclined portion of the first cross-member 35 at a vehicle front side of a main body 37A. Weld nuts 86 are also provided on an upper wall 36A of the second cross-member 36.

Seat Frames

The seat frames 72 illustrated in FIG. 8 are each an example of a reinforcement member that reinforces the housing section 40. The seat frames 72 are each members long in the vehicle front-rear direction, with four of the seat frames 72 arranged above the battery 42 in the vehicle vertical direction at intervals along the vehicle width direction. For example, two of the four seat frames 72 at the vehicle width direction outer side are respectively arranged above the rear side-members 32, 34, and two seat frames 72 at the inner side are arranged so as to straddle the battery 42 in the vehicle front-rear direction. Due to each of the four seat frames 72 being of similar configuration to each other, explanation follows regarding a seat frame 72 at the inner side and explanation of the seat frames 72 at the outer side will be omitted.

As illustrated in FIG. 9, the seat frame 72 is configured from a plate shaped member having its thickness direction in the vehicle vertical direction, and includes a main body 72A, a first coupling portion 72B, and a second coupling portion 72C. The seat frame 72 is connected to the first cross-member 35 and the second cross-member 36 in the vehicle front-rear direction. A seat 82 is provided above the seat frame 72, with a seat rail 76, described later, interposed therebetween.

The main body 72A has a substantially rectangular shaped external profile when viewed along the vehicle vertical direction. The main body 72A is disposed in the vehicle vertical direction above the battery 42, and extends along the vehicle front-rear direction. The length of the main body 72A in the vehicle front-rear direction is longer than the length of the battery 42 in the vehicle front-rear direction. Weld nuts 74 are provided at a lower face of the main body 72A, spaced apart along the vehicle front-rear direction. The seat rail 76 is mounted on an upper face of the main body 72A so as to extend along the vehicle front-rear direction. A lower portion of the seat rail 76 is fixed to the main body 72A by bolts 78 fastening into the weld nuts 74. The seat rail 76 supports the seat 82 such that the seat 82 is able to move along the vehicle front-rear direction.

The first coupling portion 72B is formed at the front of the main body 72A in the vehicle front-rear direction. More specifically, the first coupling portion 72B includes an inclined wall 73A and a flange 73B. The inclined wall 73A extends diagonally downward from a front edge of the main body 72A such that the front side of the inclined wall 73A is positioned in the vehicle vertical direction below the rear side of the inclined wall 73A. Through holes, not illustrated in the drawings, are formed in a lower portion of the inclined wall 73A so as to penetrate through in the thickness direction. The flange 73B protrudes forward from a lower edge of the inclined wall 73A. The inclined wall 73A is coupled to the first cross-member 35 by fastening a bolt 88 into the weld nut 84 provided to the first cross-member 35. In other words, the first coupling portion 72B is coupled to the first cross-member 35.

The second coupling portion 72C is formed at the rear of the main body 72A in the vehicle front-rear direction. More specifically, the second coupling portion 72C includes an inclined wall 75A and a flange 75B. The inclined wall 75A extends diagonally downward from a rear edge of the main body 72A such that the rear side of the inclined wall 75A is positioned in the vehicle vertical direction below the front side of the inclined wall 75A. The flange 75B extends rearward from a lower edge of the inclined wall 75A. Through holes, not illustrated in the drawings, are formed penetrating though the flange 75B in the thickness direction. The flange 75B is coupled to the second cross-member 36 by fastening a bolt 92 into the weld nut 86 provided to the second cross-member 36. In other words, the second coupling portion 72C is coupled to the second cross-member 36.

The seat frame 72 has a profile such that, when viewed along the vehicle width direction, the main body 72A is positioned in the vehicle vertical direction above the first coupling portion 72B and the second coupling portion 72C. In other words, the seat frame 72 has a profile such that a center portion in the longitudinal direction thereof protrudes in the vehicle vertical direction above the two end portions thereof. The seat frame 72 is disposed so as to cover the front and rear sides of the battery 42 in the vehicle front-rear direction and to cover the upper side of the battery 42 in the vehicle vertical direction when viewed along the vehicle width direction. Namely, the seat frame 72, together with the center floor panel 31, the first cross-member 35, and the second cross-member 36, surrounds the battery 42.

Operation

Next, explanation follows regarding operation and effects of the vehicle lower section structure 70 of the second exemplary embodiment.

Figure 10:
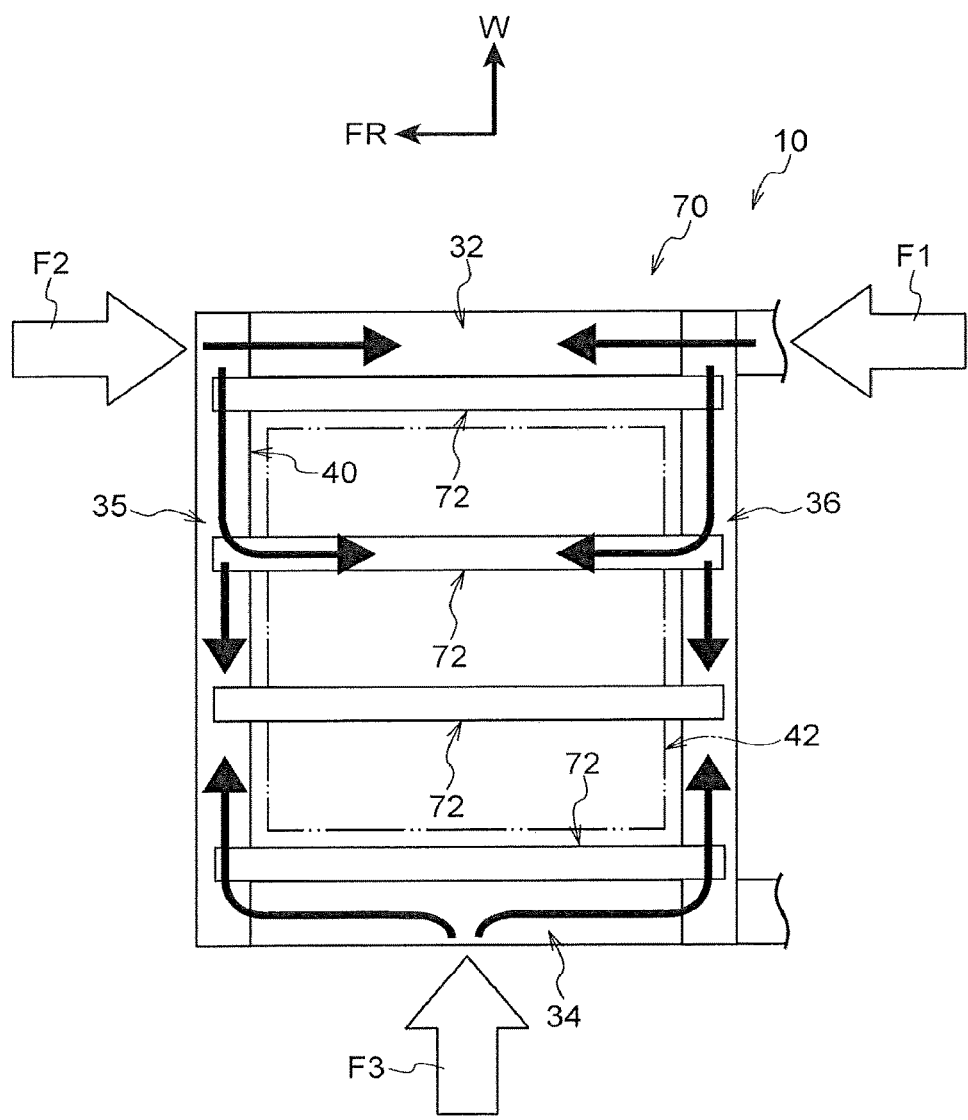
FIG. 10 is an explanatory diagram illustrating a state in which collision load acts on the vehicle lower section structure according to the second exemplary embodiment.

FIG. 10 is a diagram schematically illustrating the rear side-members 32, 34, the first cross-member 35, the second cross-member 36, the battery 42, and the seat frame 72 of the vehicle lower section structure 70.

During a collision of the vehicle 10 (during a frontal collision, a rear-end collision, or a collision from the side), members other than the rear side-members 32, 34, the first cross-member 35, the second cross-member 36, and the seat frame 72 may deform toward the battery 42. The battery 42 is housed in the housing section 40, and is surrounded by the rear side-members 32, 34, the first cross-member 35, the second cross-member 36, and the seat frame 72. The other members that have deformed toward the battery 42 therefore make contact with at least one member from out of the rear side-members 32, 34, the first cross-member 35, the second cross-member 36, or the seat frame 72. In the vehicle lower section structure 70, contact of other members with the battery 42 is accordingly suppressed compared to a configuration in which the battery 42 is not housed in the housing section 40, thereby enabling deformation of the battery 42 to be suppressed.

In the vehicle lower section structure 70, when a collision load F1 is input to the vehicle rear section of the vehicle 10 during a rear-end collision, the collision load F1 is, for example, distributed and transmitted from the rear side-member 32 to the second cross-member 36 or the first cross-member 35. Transmissions of the collision load are indicated by black arrows. Part of the collision load that has been transmitted to the second cross-member 36 is transmitted through the seat frame 72 to the first cross-member 35. In the vehicle lower section structure 70, when a collision load F2 is input to the vehicle front section of the vehicle 10 during a frontal collision, the collision load F2 is, for example, distributed and transmitted to the rear side-member 32 or the first cross-member 35. Part of the collision load that has been transmitted to the first cross-member 35 is transmitted through the seat frame 72 to the second cross-member 36.

Moreover, in the vehicle lower section structure 70, when a collision load F3 is input to a vehicle side section (for example, to a left side portion) of the vehicle 10 during a collision from the side, the collision load F3 from the rear side-member 34 is distributed to the first cross-member 35 or the second cross-member 36, and transmitted to the rear side-member 32. A portion of the collision load that has been transmitted to either the first cross-member 35 or the second cross-member 36 is transmitted through the seat frame 72 to the other of the first cross-member 35 or the second cross-member 36. Thus, in the vehicle lower section structure 70, due to the seat frame 72 configuring part of a transmission path for collision load, deformation of the first cross-member 35, the second cross-member 36, and the rear side-members 32, 34 is suppressed, enabling deformation of the battery 42 to also be suppressed. Note that although FIG. 10 illustrates a state in which load is transmitted to one seat frame 72 from out of the four seat frames 72, in reality load is also transmitted to the three other seat frames 72.

Moreover, as illustrated in FIG. 9, in the vehicle lower section structure 70 the profile of the seat frame 72 protrudes upward in the vehicle vertical direction when viewed along the vehicle width direction. Accordingly, the volume of the housing section 40 surrounded by the first cross-member 35, the second cross-member 36, the rear side-members 32, 34, and the seat frame 72 may be increased compared to a configuration in which the seat frames 72 are formed with straight line shapes along the vehicle front-rear direction.

In addition, in the vehicle lower section structure 70, the seat frame 72 is not only employed as a member to install the seat 82, but also employed as a reinforcement member to reinforce the housing section 40. The number of components is accordingly reduced in comparison to a configuration in which a reinforcement member is provided separately to the seat frame 72, enabling a reduction in weight of the vehicle 10 to be achieved.

MODIFIED EXAMPLES

The present disclosure is not limited to the exemplary embodiments described above.

In the vehicle lower section structure 30, 70, instead of the inclined portion 31B, the bottom portion 31A may be extended toward the rear of the vehicle, and the second cross-member 36 may be arranged on the bottom portion 31A.

The reinforcement member is not limited to the seat frame 72 and may be configured by a different member to the seat frame 72. For example, a battery member disposed along the vehicle front-rear direction to reinforce the housing section 40 may be employed as a different body to the seat frame 72. Both the seat frame 72 and a battery member may be employed.

The seat frame 72 may be shaped such that, when viewed along the vehicle width direction, the main body 72A is positioned at substantially the same height as the first coupling portion 72B and the second coupling portion 72C, or such that the main body 72A is positioned in the vehicle vertical direction below the first coupling portion 72B and the second coupling portion 72C. The number of the seat frames 72 is also not limited to four, and two, three, or five or more seat frames 72 may be employed. The seat frame 72 may also be integrated together with the seat rail 76.

There is no limitation to a configuration with a single battery 42, and a configuration with two or more batteries may be employed. The placement of the first cross-member 35 and the second cross-member 36 relative to the battery 42 is also not limited to a configuration in which, when viewed along the vehicle front-rear direction, the first cross-member 35 is disposed below the center in the vehicle vertical direction, and the second cross-member 36 is disposed above the center. Configuration may be made such that at least part of the first cross-member 35 and at least part of the second cross-member 36 are disposed so as to overlap with each other when viewed along the vehicle front-rear direction. The upper face of the battery 42 may also be disposed in the vehicle vertical direction below the upper faces of the first cross-member 35 and the second cross-member 36. Configuration may also be made such that the entire battery 42 overlaps with the first cross-member 35, the second cross-member 36, and the rear side-members 32, 34 when the battery 42 is viewed in the vehicle front-rear direction and the vehicle width direction.

The vehicle lower section structures 30, 70 are also not limited to a configuration including both the second cross-member 36 and the suspension cross-member 24, and configuration may be made without the suspension cross-member 24, and including the second cross-member 36 alone. Namely, the second cross-member 36 may be configured to bear force input from the rear shock absorbers 23 to the rear side-members 32, 34 through the rear suspension members 22, in a configuration in which the second cross-member also performs the function of the third cross-member.

Although explanation has been given above regarding vehicle lower section structure according to exemplary embodiments and various modified examples of the present disclosure, appropriate combinations of these exemplary embodiments and various modified examples may be employed, and obviously various embodiments may be implemented within a range not deviating from the spirit of the present disclosure.

What is claimed is:

1. A vehicle lower section structure comprising:
    a pair of rear side-members disposed in a vehicle lower section so as to be separated from each other in a vehicle width direction, the pair of rear side-members each extending in a vehicle front-rear direction;
    a first cross-member extending in the vehicle width direction, with the pair of rear side-members joined to the first cross-member;
    a second cross-member extending in the vehicle width direction at a rear side of the first cross-member in the vehicle front-rear direction, with the pair of rear side-members joined to the second cross-member;
    a battery that is housed in a housing section surrounded by the pair of rear side-members, the first cross-member, and the second cross-member, at least part of the battery overlapping with the pair of rear side-members when viewed along the vehicle width direction, and at least part of the battery overlapping with the first cross-member and the second cross-member when viewed along the vehicle front-rear direction; and
    a reinforcement member comprising:
        a main body disposed in a vehicle vertical direction above the battery,
        a first coupling portion formed at a front side of the main body in the vehicle front-rear direction and directly joined to the first cross-member, and
        a second coupling portion formed at a rear side of the main body in the vehicle front-rear direction and directly joined to the second cross-member.

2. The vehicle lower section structure of claim 1, wherein the reinforcement member has a profile such that the main body is positioned in the vehicle vertical direction above the first coupling portion and the second coupling portion when viewed along the vehicle width direction.

3. The vehicle lower section structure of claim 1, wherein the reinforcement member is a seat frame to install a seat thereon.

4. The vehicle lower section structure of claim 1, wherein:
the housing section comprises a floor panel comprising
- a bottom portion extending in the vehicle front-rear direction below the battery in the vehicle vertical direction, and
- an inclined portion extending diagonally upward toward a rear side from a rear edge of the bottom portion in the vehicle front-rear direction; and the second cross-member is arranged on the inclined portion.

5. The vehicle lower section structure of claim 1, wherein:
the vehicle lower section further comprises
- a rear suspension member installed with a rear shock absorber, and
- a third cross-member extending along the vehicle width direction with the pair of rear side-members joined to the third cross-member, the third cross-member being configured to bear force input from the rear shock absorber to the pair of rear side-members through the rear suspension member; and the second cross-member is disposed at a front side of the third cross-member in the vehicle front-rear direction.

6. The vehicle lower section structure of claim 1, wherein the first cross-member includes an upper cross-member and a lower cross-member presenting a substantially hexagonal shaped profile closed cross-section when viewed along the vehicle width direction.

7. The vehicle lower section structure of claim 1, wherein the second cross-member presents a substantially L-shaped cross section when viewed along the vehicle width direction, the second cross-member including an upper wall, an upper flange protruding out from a rear edge of the upper wall toward a rear of the vehicle, a vertical wall extending downward in the vehicle vertical direction from a front edge of the upper wall, and a lower flange protruding from a lower edge of the vertical wall toward a front of the vehicle.

* * * * *